US007734291B2

(12) United States Patent
Mazzara, Jr.

(10) Patent No.: US 7,734,291 B2
(45) Date of Patent: Jun. 8, 2010

(54) METHOD AND SYSTEM FOR STORING IOTA ALERT MESSAGE REQUESTS FOR A VEHICLE COMMUNICATIONS SYSTEM INTO A QUEUE

(75) Inventor: William E. Mazzara, Jr., Drayton Plains, MI (US)

(73) Assignee: General Motors LLC, Detroit, MI (US)

( * ) Notice: Subject to any disclaimer, the term of this patent is extended or adjusted under 35 U.S.C. 154(b) by 919 days.

(21) Appl. No.: 10/193,488

(22) Filed: Jul. 11, 2002

(65) Prior Publication Data

US 2004/0009772 A1 Jan. 15, 2004

(51) Int. Cl.
 *H04Q 7/20* (2006.01)
(52) U.S. Cl. .................. 455/436; 455/432.1; 455/466
(58) Field of Classification Search .......... 455/466, 455/418, 419, 414.1
See application file for complete search history.

(56) References Cited

U.S. PATENT DOCUMENTS 6,047,071 A * 4/2000 Shah ..................... 380/273
6,148,137 A * 11/2000 Kusano et al. ............ 386/51
6,243,579 B1 * 6/2001 Kari ...................... 455/426.1
6,751,463 B1 * 6/2004 Lorello et al. ............ 455/466
2002/0028673 A1 * 3/2002 Chang et al. ............. 455/419
2004/0203941 A1 * 10/2004 Kaplan et al. ............ 455/466

FOREIGN PATENT DOCUMENTS

WO  WO 98/41044  * 9/1998

\* cited by examiner

*Primary Examiner*—CongVan Tran
(74) *Attorney, Agent, or Firm*—Anthony L. Simon; Reising Ethington P.C.

(57) ABSTRACT

The invention provides a method for storing an alert message request for a vehicle communication system into a message queue by initiating an acquisition task to determine service availability, receiving an alert message request from a wireless communication system, storing the alert message request into the vehicle communication unit message queue, and servicing the alert message request until completion.

2 Claims, 6 Drawing Sheets

METHOD AND SYSTEM FOR STORING IOTA ALERT MESSAGE REQUESTS FOR A VEHICLE COMMUNICATIONS SYSTEM INTO A QUEUE

FIELD OF THE INVENTION

In general, the invention relates to alert message reception from a wireless communication system to a vehicle communication system. More specifically, the invention relates to storing an alert message request between a wireless communication system and a vehicle communication system in a queue until request is serviced.

BACKGROUND OF THE INVENTION

A rapidly increasing segment of modern vehicles, such as passenger cars, buses, trains, boats and aircraft, are being equipped with integrated wireless communications systems. Integrated wireless communications solutions enables vehicles to have embedded systems with access to mobile services, such as navigation services, cellular phone services, emergency help/assistance, traffic information, directory assistance services, Internet web access for web browsing and email, remote car diagnostics, anti-theft tracking, in-car office, and other analog or digital voice and data communications applications.

Such embedded communications devices, contained within the vehicle communication unit and/or mobile station, may require parameter updates to enhance services. The complexity and effort of provisioning mobile stations and activating users can be greatly reduced using wireless network initiated over-the-air service provisioning (OTASP) mechanisms. Wireless carriers sometimes have the need to periodically update code division multiple access (CDMA) parameters stored in the mobile stations of their user community. (A mobile station is a station, fixed or mobile, which serves as the end user's wireless communication link with the base station. Mobile stations include, for example, portable units, such as, hand-held personal units and units installed in vehicles.) The capability to update CDMA parameters over-the-air (over-the-air parameter administration (OTAPA)) reduces the complexity of having mobile stations brought into service centers for reprogramming. Thus, this capability enhances customer satisfaction by maintaining mobile station parameters and operations with only minor impact to the user. In other words, this reduces the need to visit a dealer, service depot, or other third party.

Recent advances in the wireless technologies industry have addressed the need for a comprehensive and extensible system for over-the-air mobile station provisioning and parameter administration with the establishment of a configuration management service, the internet protocol based over-the-air activation (IOTA) standard. (This standard creates a system capable of delivering provisioning information as well as customer care to subscribers of wireless telephones). The wireless carrier network has the ability to transmit to a mobile station the desired data or other parameters over the air interface. The wireless carrier network also has the ability to receive update requests from a mobile station. Seemingly, it is possible for a mobile station to receive or initiate multiple parameter update requests in succession from a wireless carrier before completing an update request. It would be beneficial for the vehicle communication system to be able to store any subsequent update service parameters until a pending update request has been completed.

Thus, there is a significant need for a method and system for storing parameter updates from wireless communication systems to vehicle communication systems, until the requests have been serviced.

SUMMARY OF THE INVENTION

One aspect of the invention provides a method for storing an alert message request for a mobile vehicle communication system into a message queue. The at least one wireless communication system sends an alert message request. The mobile communication system initiates an acquisition task which determines service type availability. Upon determining service type availability, the mobile communication system receives an alert message request from the wireless communication system, sets an outdated preferred roaming list flag, queues the alert message request, and initiates a parameter call request as indicated by the message. The mobile communication system services the alert message request until completion.

Another aspect of the invention provides a system for storing an alert message request for a mobile vehicle communication system into a message queue. The system may include means for sending an alert message request from the at least one wireless communication system. The system also may include means for determining service type availability for the mobile vehicle communication system and means for receiving an alert message request from the wireless communication system. The system may further include means for setting an outdated preferred roaming list flag, means for storing the alert message request into a message queue, and means for initiating a parameter call request as determined by the message.

Another aspect of the invention provides a computer readable medium for storing a computer program. The computer program is comprised of computer readable code capable of initiating communications between a mobile vehicle communication system and a wireless communication system. Further, the computer readable code can be used to determine the mobile vehicle communication system service type availability, receive an alert message request from the at least one wireless communication system, store the alert message request into a first in first out queue, and initiate a parameter call request. Finally, computer readable code is used to service the pending alert message request until request is completed.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
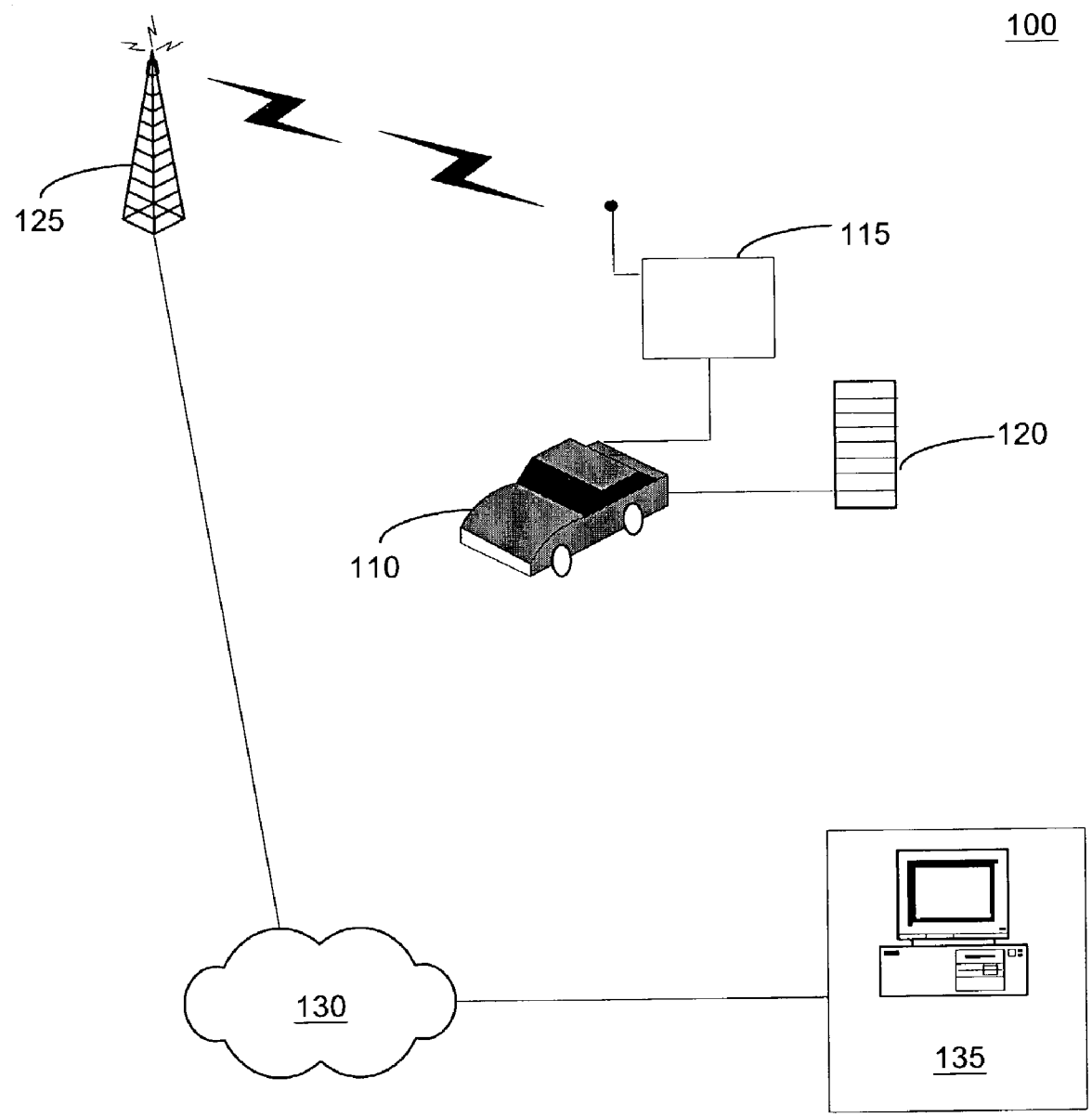
FIG. 1 is a schematic diagram of one embodiment of a system for accessing a mobile vehicle communication system using a wireless communication system, in accordance with the present invention.

FIG. 1 shows an illustration of one embodiment of a system for communicating with a mobile vehicle to a service provider in accordance with the present invention, and may be referred to as a mobile vehicle communication system (MVCS) 100. The system 100 may include one or more vehicle clients 110, one or more carrier systems 125. one or more communication networks or wide area networks (WAN) 130, and one or more service providers 135. Vehicle client 110 may be any suitable vehicle. For example, the vehicle may be an automobile or a passenger carrying unit such as a bus, train, boat or aircraft.

Vehicle client 110 includes a Vehicle Communication Platform (VCP) 115 capable of providing remote services to the vehicle via a wireless communication link with one or more service providers 135, and is comprised of software, hardware, or software and/or hardware. The VCP is capable of, but not limited to, receiving IOTA Alert SMS Messages and storing them to the IOTA Alert SMS Message First In First Out (FIFO) message queue 120 of the vehicle client 110. The message queue 120 is not necessarily embedded in the VCP 115, for example, the message queue 120 can be located inside any module in a vehicle communication system in communication with the WAN device 130.

The at least one carrier system 125 may be any suitable system for transmitting a signal between a vehicle and a service provider 135 via a communications network. In one embodiment of the invention the carrier system 125 is code division multiple access (CDMA), or may be later adapted for a personal communications system (PCS), a global system for mobile communication (GSM), or the like. Other examples of carrier systems are radio links such as microwave, citizen's band (CB), dedicated radio systems such as police, military, or any other suitable radio communications link.

Communications network 130 is any suitable system for communicating between vehicle client 110 or carrier systems 125 and a service provider 135. In one embodiment of the invention the communications network is a public switched telephone network (PSTN). In another embodiment of the invention, the communications network is a multi-protocol internet protocol (IP) network such as Internet, extranet, private network, virtual private network (VPN), or any other wide area network (WAN) capable of carrying voice and/or digital data in either digital and/or analog format. Alternatively, the communications network may be a hybrid or virtual communication network. Service provider 135 is any remote system that can provide IOTA and/or OTASP wireless services to the vehicle client. The service provider 135 may be a single service provider or a combination of several service providers. The service provider may be capable of serving multiple vehicle clients simultaneously.

Figure 2:
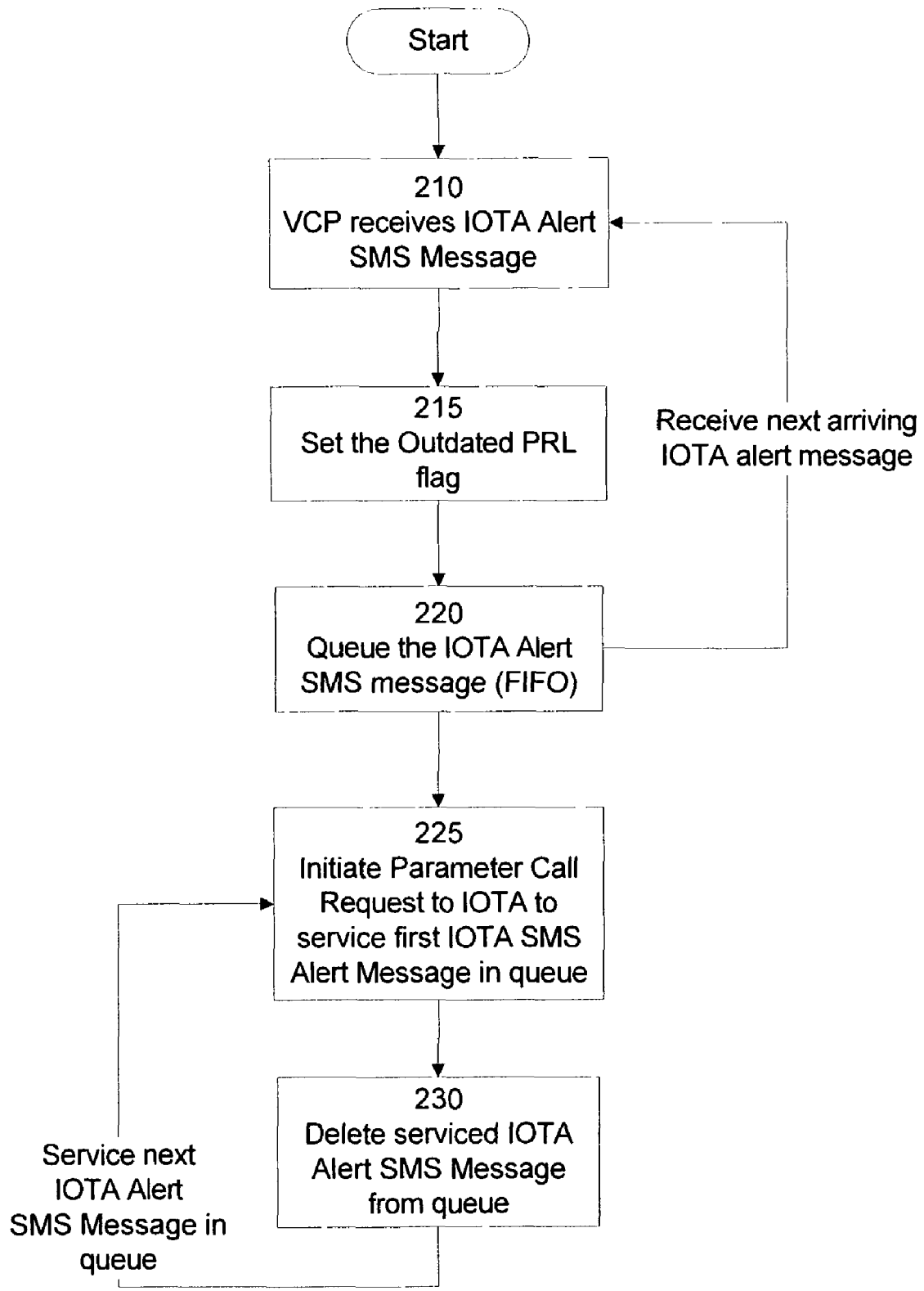
FIG. 2 is a flow diagram of one embodiment of a message queue for updating parameters, compatible with the mobile vehicle communication system of FIG. 1, in accordance with the present invention.

FIG. 2 depicts a high-level diagram of a message queue for updating parameters of the mobile vehicle communication system in one embodiment of the present invention. The VCP 115 receives an IOTA Alert SMS Message (Block 210), and services it until completion. Upon successful completion, the message is deleted from the queue. The process of receiving and queuing of messages is independent of servicing them, in other words performing the parameter update.

The VCP 115 of vehicle client 110 receives IOTA Alert SMS Message (Block 210) followed by setting the outdated preferred roaming list (PRL) flag (Block 215). The IOTA Alert SMS Message is stored in the First In First Out (FIFO) queue (Block 220). The FIFO queuing method ensures the messages are serviced in the order received. The FIFO queue size is determined by the VCP 115 design limitations. Multiple IOTA Alert SMS Messages may be received and queued before the messages may be serviced (Block 210), for example due to unsuccessful digital service provider acquisition task. The VCP 115 initiates a parameter call request to IOTA to service first alert message in queue (Block 225). The serviced alert messages are deleted from the queue (Block 230) before servicing next alert message in FIFO queue (Block 225). The alert message is only deleted when successfully fulfilled or a retry limit has been reached. The retry limit may be a static parameter or a dynamically determined parameter.

Figure 3:
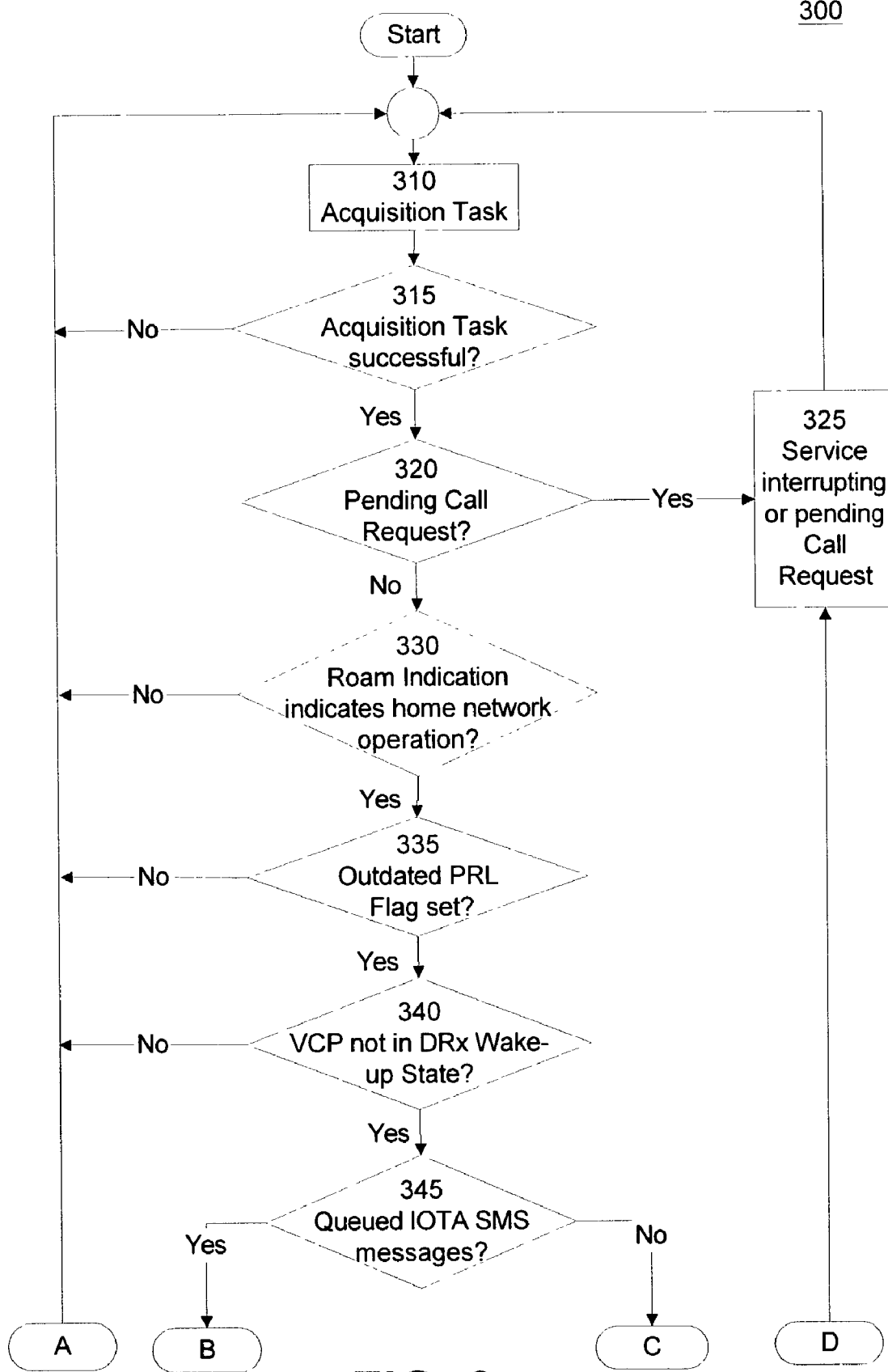
FIGS. 3A and 3B are flow diagrams of one embodiment of a method for storing a data message into a message queue utilizing the systems of FIG. 1 and FIG. 2, in accordance with the current invention.
Figure 3:
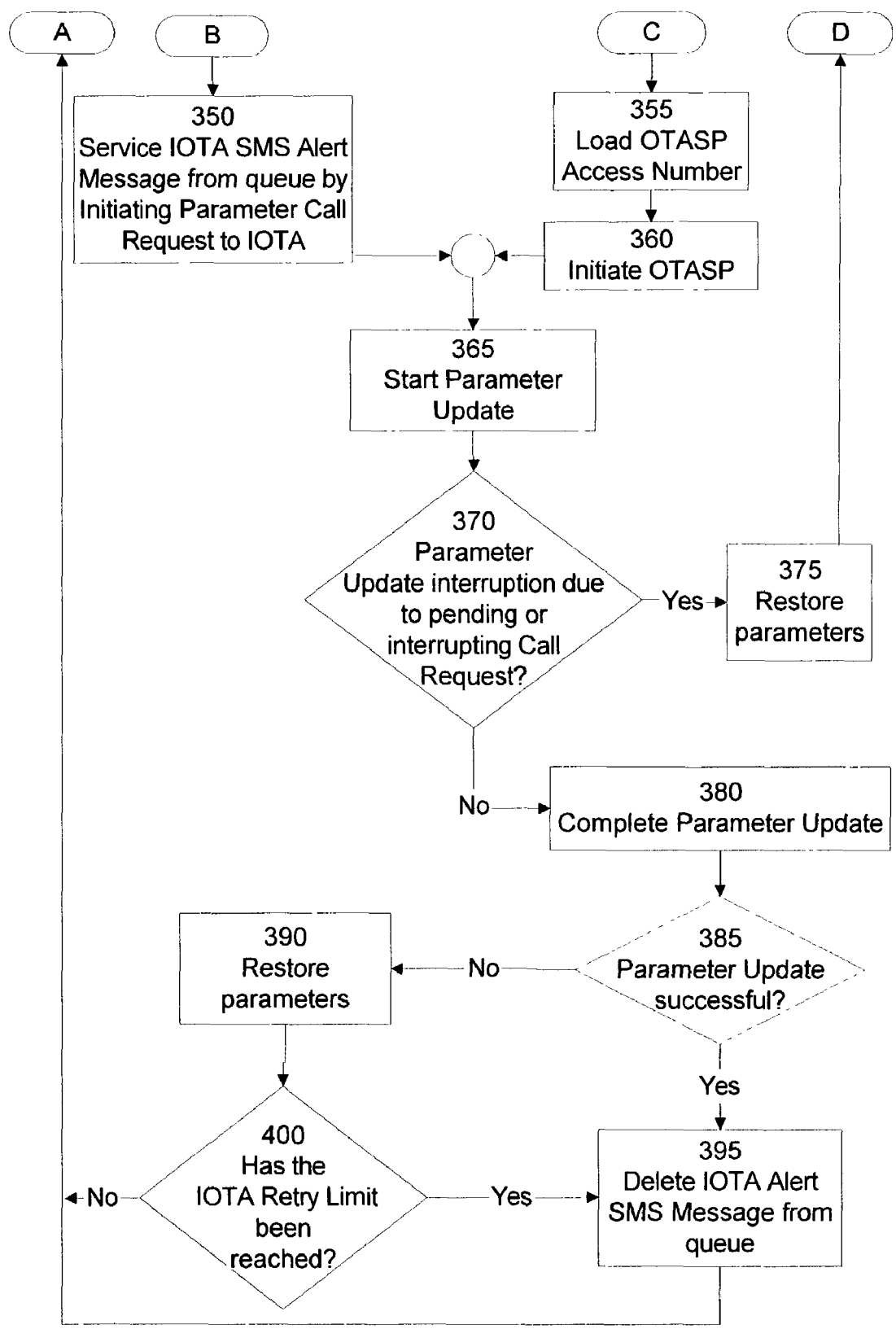

FIGS. 3A and 3B show one embodiment of the parameter update process which services the IOTA Alert SMS Messages in the message queue (Block 300). The preconditions to serving a message are 1) the successful completion of acquisition task, 2) home-network operation, 3) outdated PRL Flag is set, 3) the VCP 115 is not in a discontinuous reception (DRx) wake-up state, and 4) there are no pending call requests.

The acquisition task begins the parameter update process (Block 310) when the VCP 115 attempts to discover whether digital service is available. The acquisition task can determine whether digital service, analog service, or no service is available. If the acquisition task finds digital service, the VCP 115 determines if there is a pending call request (Block 320). A call request (Block 320) can be initiated by the user at any time, and takes precedence over the parameter update process (Block 325) by servicing the interrupting or pending call request. When a parameter update is preempted by a call request, the task will be postponed to the next acquisition task (Block 325). If there are no pending call requests, test the roam indication flag is setting for home network operation (Block 330). The roam indication is the record of the preferred roaming list (PRL) for the digital service provider which indicates whether the acquired network constitutes home network operation. If the acquired network does not constitute home network operation, a retry acquisition task (Block 310) may occur.

Upon successful home network operation acquisition, the outdated PRL flag state is determined (Block 335). The outdated PRL flag is set whenever a new alert message is received. If the flag is not set, a retry acquisition task (Block 310) may occur. The VCP 115 shall wait until a condition, defined by CDMA standards, is detected before a retry acquisition task (Block 310) occurs. If the flag is set, the VCP 115 is checked to determine the operation mode (Block 340). If the VCP 115 is in a discontinuous reception (DRx) wake-up state, retry the acquisition task (Block 310), otherwise the VCP 115 determines whether an alert message has been queued (Block 345). If the VCP 115 has a queued alert message (Block 345), service the alert message in the FIFO queue by initiating a parameter call request to IOTA as indicated in the SMS message (Block 350). If there is no queued alert message (Block 345) load the over-the-air service provisioning (OTASP) Access Number (Block 355), and initiate OTASP (Block 360). At this point, the mobile station has the necessary information obtained via IOTA or OTASP, and the parameter update may be initiated (Block 365). Test for parameter update interruption (Block 370), which can be due to a pending call or interrupting call request. A call request can take place at any time and takes precedence over the parameter update by interrupting the process to service the call request. If the parameter update is interrupted (Block 370), the original parameters are restored (Block 375) prior to servicing call request (Block 325). The parameter update task is postponed until the digital communication is determined by the acquisition task (Block 310). If the parameter update is not interrupted (Block 370), the parameter update is completed (Block 380). The next step is to determine if the parameter update was successful (Block 385). If the parameter update was not successful, restore the original parameters (Block 390). If an IOTA retry limit (Block 399) has been reached for this given message delete alert message from the queue (Block 395), otherwise perform acquisition task (Block 310). It is possible for multiple queued IOTA Alert SMS Messages to be serviced in succession provided all the preconditions are met.

Figure 4:
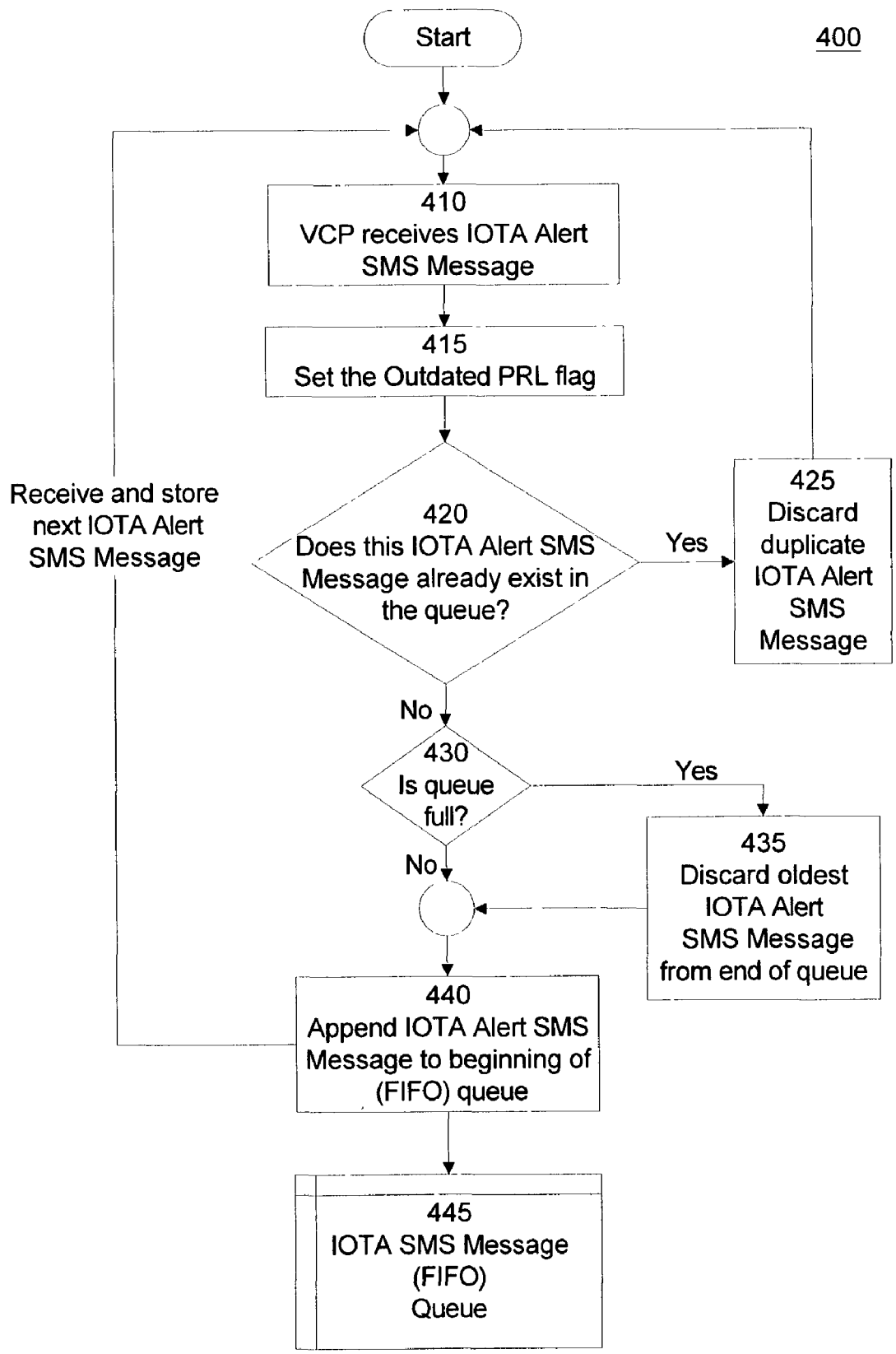
FIG. 4 is flow diagram of one embodiment of a message queue for storing parameter update requests utilizing the systems of FIG. 1, FIG. 2, FIG. 3A and FIG. 3B, in accordance with the current invention.

FIG. 4 shows one embodiment of the IOTA Alert SMS Message reception and queuing process 400. The VCP 115 receives an IOTA Alert SMS Message (Block 410) and sets the outdated PRL flag (Block 415). This IOTA Alert SMS Message is tested to determine whether it already exists in the queue (Block 420). If the message already exists in the queue, the duplicate IOTA Alert SMS Message is discarded (Block 425), and the next IOTA Alert SMS Message can be received and queued. If the message does not already exist (Block 420), determine whether the message queue is full (Block 430). There may be a limitation to how many messages the queue can store before it is full. When the queue is full, an arriving message will cause the oldest message to be discarded (Block 435) from the FIFO queue, thereby always maintaining the most recent unique messages. If the queue is not full, the IOTA Alert SMS Message is appended to the FIFO queue (Block 440). Finally, the next arriving IOTA Alert SMS Message can be received and queued. The FIFO queue (Block 445) is used to implement storing the IOTA Alert SMS Messages. A FIFO message queue is a First In First Out linear collection of messages. The most recently added message is appended to the tail of the queue and is the last message to be serviced. The oldest message is the first message to be serviced as it is read from the head of the queue.

Figure 5:
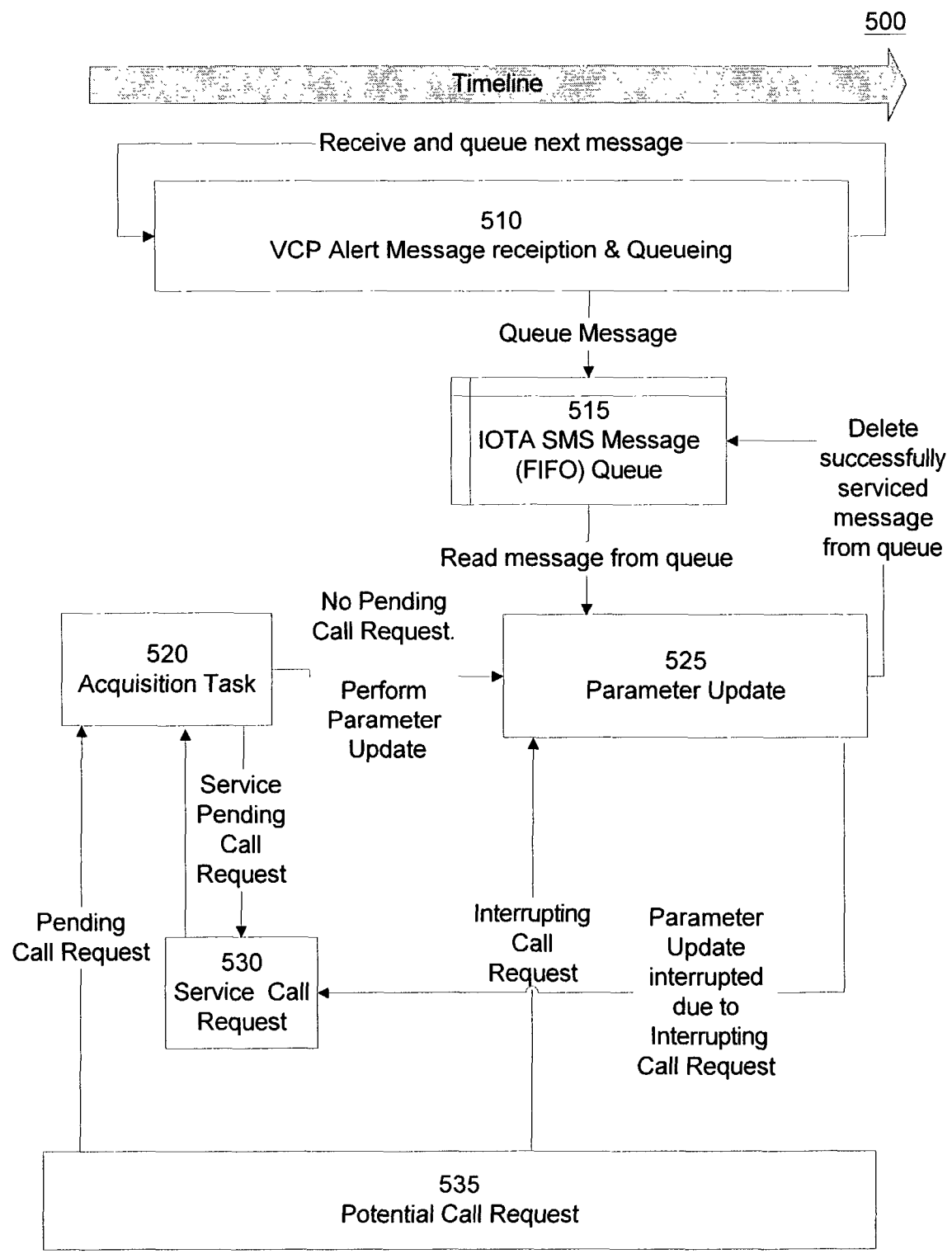
FIG. 5 is a sequence diagram of one embodiment of a method for storing a data message into a message queue utilizing the systems of FIG. 1, FIG. 2, FIG. 3A, FIG. 3B and FIG. 4, in accordance with the current invention.

FIG. 5 depicts a sequence flow of one embodiment of the interruption of parameter update process 500. VCP IOTA Alert SMS Messages are received and queued into the IOTA Alert SMS Message FIFO queue (Block 515). Multiple IOTA Alert SMS Messages may be received in succession before the parameter update process (Block 525) services the message. The acquisition task is performed by the VCP to discover a digital service provider (Block 520). If a pending call request (Block 530) occurs during the acquisition task (Block 520), the call request takes precedence over the parameter update, and the call request is serviced (Block 530) as indicated.

The parameter update (Block 525) is initiated by a successful acquisition task as long as there are no pending call requests. The parameter update task (Block 525) can be interrupted by a call request (Block 530). The parameter update task (Block 525) is postponed until the next acquisition task (Block 520) due to intervening service call request (Block 530). A potential call request (Block 535) can take place at any time to preempt or interrupt the parameter update task (Block 525).

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim

1. A method for updating parameters in a mobile vehicle communication system, the method comprising:
   receiving an alert message request from a wireless communication system;
   setting a preferred roaming list flag in response to the alert massage request; and
   storing the alert message request in a message queue;
   initiating a parameter call to the wireless communication system based on the preferred roaming list flag, message queue, and alert message request; and
   updating parameters in response to the initiation.

2. The method of claim 1 wherein receiving an alert message request from a wireless communication system comprises receiving an Internet Protocol based over-the-air activation alert in a Short Message System message at a Vehicle Communication Platform and determining whether the received alert message already exists in a message queue, and wherein storing the alert message request in the message queue comprises determining if the queue is lull and appending the alert message to the beginning of the queue in a first-in-first-out queue based on the determination, and wherein initiating a parameter call comprises determining whether the vehicle communication platform is in a discontinuous receive state and initiating the parameter call based on the discontinuous receive state determination, and wherein updating parameters in response to the initiation comprises deleting the alert message in response to the updating.

* * * * *